United States Patent
Kanazawa et al.

(10) Patent No.: US 11,879,687 B2
(45) Date of Patent: Jan. 23, 2024

(54) METHOD OF DESIGNING HEAT EXCHANGER GROUP AND PROCESSING PLANT

(71) Applicant: JGC CORPORATION, Kanagawa (JP)

(72) Inventors: Satoru Kanazawa, Kanagawa (JP); Masaki Ikeda, Kanagawa (JP); Toshikazu Miyashita, Kanagawa (JP)

(73) Assignee: JGC CORPORATION, Kanagawa (JP)

( * ) Notice: Subject to any disclaimer, the term of this patent is extended or adjusted under 35 U.S.C. 154(b) by 239 days.

(21) Appl. No.: 17/414,932

(22) PCT Filed: Mar. 20, 2019

(86) PCT No.: PCT/JP2019/011793
§ 371 (c)(1),
(2) Date: Jun. 16, 2021

(87) PCT Pub. No.: WO2020/188805
PCT Pub. Date: Sep. 24, 2020

(65) Prior Publication Data
US 2022/0065538 A1    Mar. 3, 2022

(51) Int. Cl.
*F28D 1/04*     (2006.01)
*F25J 1/00*     (2006.01)

(52) U.S. Cl.
CPC ............. *F28D 1/04* (2013.01); *F25J 1/0022* (2013.01)

(58) Field of Classification Search
CPC .. F28D 1/04; F28D 1/024; F28D 1/053; F25J 1/0259; F25J 1/0052; F25J 1/0087;
(Continued)

(56) References Cited

U.S. PATENT DOCUMENTS

2009/0182538 A1    7/2009  Yanami et al.
2010/0223198 A1    9/2010  Noureldin et al.
2011/0307430 A1*  12/2011  Singhee ................. G06F 17/11
                                                              706/55

FOREIGN PATENT DOCUMENTS

AU      2014245852      10/2017
CN      101504689       8/2009
(Continued)

OTHER PUBLICATIONS

AHA Kashani et al., Thermal-economic optimization of an air-cooled heat exchanger unit, 2013 (Year: 2013).*
"Search Report of Europe Counterpart Application", dated Sep. 9, 2022, pp. 1-9.
Office Action of Korean Counterpart Application, with English translation thereof, dated Feb. 23, 2023, pp. 1-10.
(Continued)

*Primary Examiner* — Frantz F Jules
*Assistant Examiner* — Webeshet Mengesha
(74) *Attorney, Agent, or Firm* — JCIPRNET

(57) ABSTRACT

Provided is a method of designing a heat exchanger group being installed in a processing plant and having multiple ACHEs. In a first step, at least one design variable relating to ACHE design and the number of installed ACHEs are set as variable parameters, and a variable range and a change unit of each of the variable parameters are set. In a second step, a design value of the ACHE, which includes a value of a design variable non-selected as the variable parameter, is set. In a third step, Pareto solutions for at least two objective functions selected from an objective function group consisting of an installation length of the heat exchanger group, a total heat transfer area of heat transfer tubes, and total power consumption of fans are calculated by using a computer while the variable parameter are changed.

7 Claims, 11 Drawing Sheets

(58) Field of Classification Search
CPC ...... F25J 1/0055; F25J 2290/10; G06F 30/18; G06F 2111/06; G06F 2119/08; G06F 2113/08; F28F 2200/00
See application file for complete search history.

(56) References Cited

FOREIGN PATENT DOCUMENTS

| | | |
|---|---|---|
| CN | 106845019 | 6/2017 |
| CN | 107451363 | 12/2017 |
| CN | 108446447 | 8/2018 |
| JP | H07134700 | 5/1995 |
| JP | 2006285381 | 10/2006 |
| JP | 4825099 | 11/2011 |
| JP | 2014037904 | 2/2014 |
| JP | 5476025 | 4/2014 |
| JP | 2016514823 | 5/2016 |
| JP | 2016200903 | 12/2016 |
| JP | 2017020554 | 1/2017 |
| JP | 6360987 | 7/2018 |
| KR | 101928654 | 12/2018 |
| WO | 2017175384 | 10/2017 |

OTHER PUBLICATIONS

Amir Hesam Alinia Kashani et al., "Thermal-economic optimization of an air-cooled heat exchanger unit", Applied Thermal Engineering, vol. 54, Jan. 2013, pp. 43-55.

"International Search Report (Form PCT/ISA/210) of PCT/JP2019/011793," dated Jun. 11, 2019, with English translation thereof, pp. 1-4.

Shinya Watanabe, "Genetic Algorithm for Multi-Objective Optimization", Doctoral Thesis, Department of Sciences and Informatics, Doshisha University, Mar. 2003, submit with partial English translation, pp. 1-225.

Nozomu Kogiso et al., "Constraint Handling in Multiobjective Particle Swarm Optimization Incorporating Sensitivity Analysis on Constraint Condition", Transactions of the JSME, Jan. 2012, submit with partial English translation and English abstract, pp. 1-22.

Tenda Okimoto et al., "A Study for Solving a Dynamic Multi-Objective Distributed Constraint Optimization", The 27th Annual Conference of the Japanese Society for Artificial Intelligence, Jun. 2013, submit with English translation, pp. 1-8.

Office Action of Korea Counterpart Application, with English translation thereof, dated Aug. 22, 2023, pp. 1-8.

"Office Action of Europe Counterpart Application", dated Nov. 30, 2023, p. 1-p. 9.

* cited by examiner (A)

TOTAL BANK LENGTH (B)

(C)

METHOD OF DESIGNING HEAT EXCHANGER GROUP AND PROCESSING PLANT

CROSS-REFERENCE TO RELATED APPLICATION

This application is a 371 application of the international PCT application serial no. PCT/JP2019/011793, filed on Mar. 20, 2019. The entirety of the above-mentioned patent application is hereby incorporated by reference herein and made a part of this specification.

TECHNICAL FIELD

The present invention relates to a technology of designing a heat exchanger group such as an air cooled heat exchanger group, and relates to a treatment plant having the heat exchanger group.

BACKGROUND ART

In a processing plant such as liquefied natural gas (LNG) plant or a petroleum refining plant, a process of cooling various kinds of fluid to be cooled is performed. For example, an air cooled heat exchanger (ACHE) is a kind of heat exchanger, which is configured to supply cooling air to a plurality of tubes (heat transfer tubes) so as to cool fluid to be cooled flowing through the tubes. The ACHE can cool the fluid to be cooled without using a liquid refrigerant such as cooling water, and hence is widely employed in various types of processing plants.

For example, about one hundred ACHEs are installed in the LNG plant in some cases. Determination of the number of ACHEs to be installed and an area of an installation region for the ACHEs is one of important considerations to be first examined at the time of determination of a plot plan of the overall LNG plant.

Meanwhile, a fan configured to supply the cooling air and a driving mechanism therefor are required to be provided to the ACHE, and hence the structure thereof is liable to be complicated. Thus, for designing of the ACHE, a plurality of design variables are required to be determined. The number of combinations of design values, with which required cooling capability can be achieved, is not limited to one.

Owing to the circumstances described above, a trial-and-error process is sometimes required to be repeated at great effort for designing of an ACHE group in the processing plant.

In Patent Literature 1 and Patent Literature 2, there are described a technology of optimizing a plurality of objective functions relating to an airfoil of a helicopter rotor blade and those relating to a golf club shaft with use of a computer or computation means, respectively. However, a technology needed to design the ACHE group is not disclosed.

CITATION LIST

Patent Literature

[Patent Literature 1] JP 4825099 B
[Patent Literature 2] JP 5476025 B

SUMMARY OF INVENTION

Technical Problem

The present invention has been made under the circumstance described above, and has an object to provide a technology of efficiently designing a heat exchanger group to be installed in a processing plant configured to process fluid to be processed, and provides a treatment plant having the heat exchanger group.

Solution to Problem

According to one embodiment of the present invention, there is provided a method of designing a heat exchanger group, which is installed in a processing plant configured to process fluid to be processed and includes a plurality of air cooled heat exchangers (ACHEs), the method including: a first step of setting at least one design variable selected from a design variable group consisting of a design variable relating to a tube bundle to be provided to each of the ACHEs, a design variable relating to each of heat transfer tubes to be included in the tube bundle, and a design variable relating to a fan to be provided to each of the ACHEs, and the number of ACHEs to be installed in the heat exchanger group as variable parameters and setting a variable range of each of the variable parameters; a second step of setting a design value of each of the ACHEs, which is included in the design variable group and includes a value of the design variable non-selected as the variable parameter; and a third step of, after the setting of the design value, calculating Pareto solutions for at least two objective functions selected from an objective function group consisting of an installation length of the heat exchanger group when the plurality of ACHEs are arranged in one row, a total heat transfer area of the heat transfer tubes to be included in the heat exchanger group, and total power consumption of the fans included in the heat exchanger group with use of a computer while changing the variable parameters.

The method of designing a heat exchanger group may have the following features.

(a) In the third step, the Pareto solutions are calculated by a multi-objective genetic algorithm or a multi-objective particle swarm optimization method.

(b) When a plurality of the heat exchanger groups are to be installed in the processing plant, the method further includes: a fourth step of executing the first step to the third step for each of the plurality of heat exchanger groups to calculate first Pareto solutions being the Pareto solutions for the objective functions of the installation length and the total heat transfer area; and a fifth step of selecting a combination of the installation length and the total heat transfer area from the first Pareto solutions for each of the plurality of heat exchanger groups and calculating at least one of a total installation length of the ACHEs of the plurality of heat exchanger groups when the ACHEs are arranged in one row and device cost of the plurality of heat exchanger groups based on a result of the selection of the combination. In this case, in the fifth step, second Pareto solutions are calculated for both of the total installation length and the device cost as the objective functions. In this case, in the fifth step, the second Pareto solutions are calculated by dynamic programming.

(c) The design variable relating to the tube bundle includes a design variable selected from the number of tube bundles to be provided to one ACHE, the number of heat transfer tubes to be included in the tube bundle, the number of passages of each of the heat transfer tubes to be included in the tube bundle, the number of stages of the heat transfer tubes in the tube bundle, a type of arrangement intervals between the heat transfer tubes in the tube bundle, and a tube length of each of the heat transfer tubes from one end to another end of the tube bundle, the design variable relating to each of the heat transfer tubes includes a design variable selected from an outer diameter of each of the heat transfer tubes, a wall thickness of each of the heat transfer tubes, and an arrangement pitch of the heat transfer tubes, and the design variable relating to the fan includes a design variable selected from the number of fans to be installed in one ACHE, a diameter of the fan, a fan efficiency of the fan, and a face velocity of cooling air to be supplied to the ACHE by the fan.

(d) The processing plant is a liquefied natural gas plant, a petroleum refining plant, or a gas processing plant.

Further, in a processing plant configured to process fluid to be processed, the processing plant includes a plurality of the ACHEs designed by the method of designing a heat exchanger group described above.

Advantageous Effects of Invention

With the method of designing an ACHE group of this example, the following effects are attained. The Pareto solutions are calculated with use of the computer for the plurality of objective functions selected from the installation length of the plurality of air cooled heat exchangers (ACHE group), the total heat transfer area of the heat transfer tubes, and the total power consumption of the fans. Thus, optimal design values, which meet demands for the processing plant, can be obtained.

DESCRIPTION OF EMBODIMENTS

Figure 1:
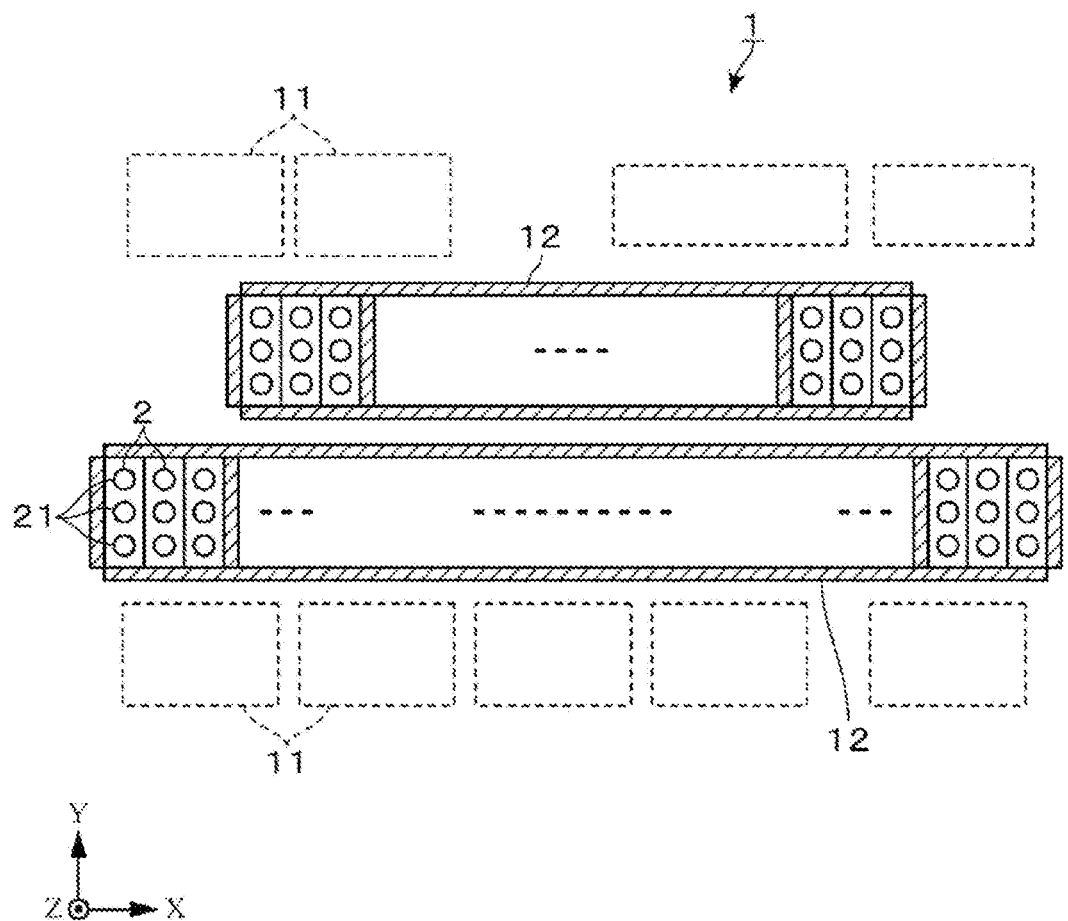
FIG. 1 is a schematic plot diagram of an LNG plant.

FIG. 1 is a schematic plot of a liquefied natural gas (LNG) plant 1 being a processing plant to which a method of designing an ACHE group of this example is applied. The LNG plant 1 has a configuration in which regions for arrangement of devices to be included in the LNG plant 1 (device arrangement regions 11) are arranged side by side in the vicinity of pipe racks 12.

Figure 2:
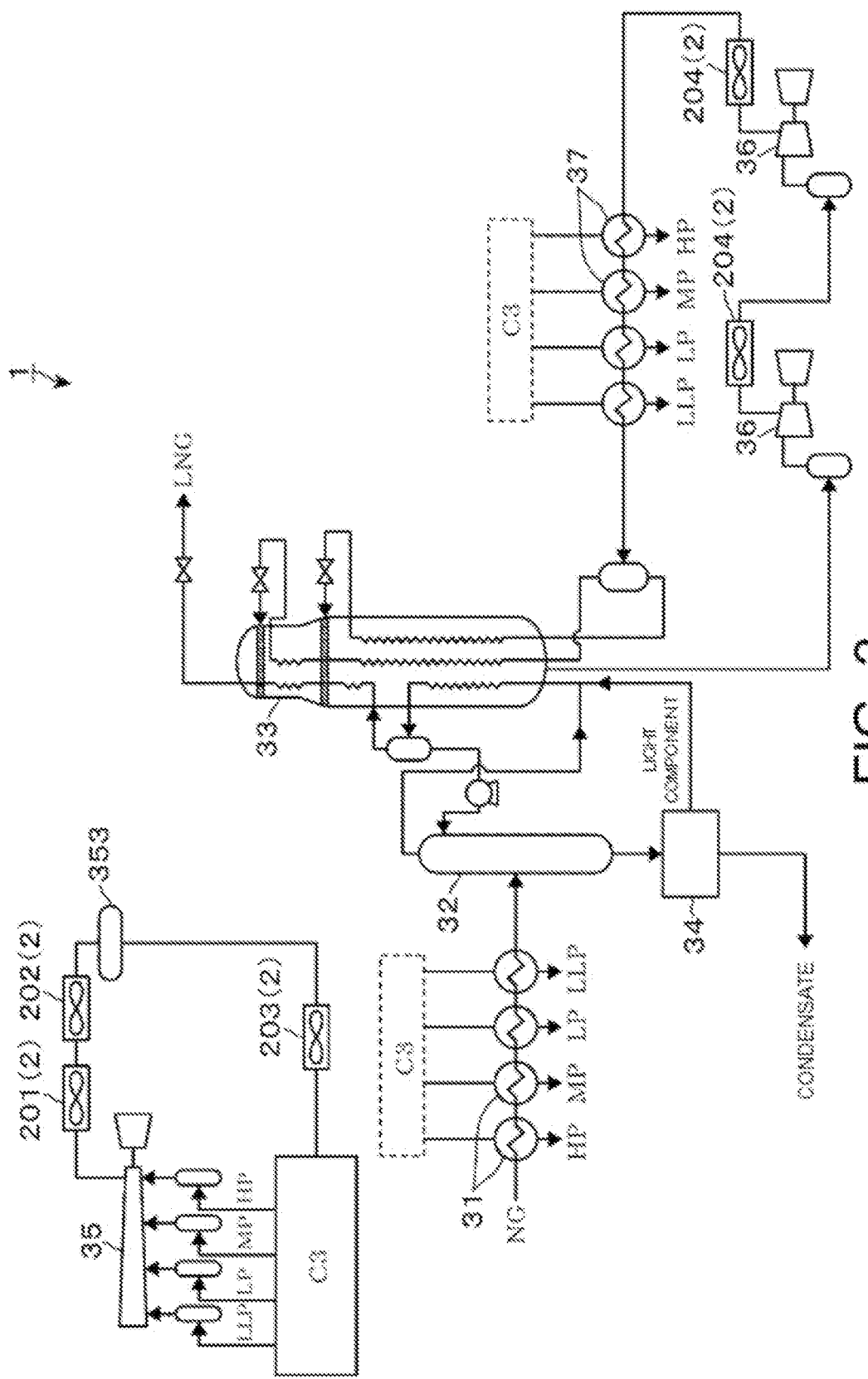
FIG. 2 is an explanatory view for illustrating a configuration example of the LNG plant.

With reference to FIG. 2, a configuration example of the LNG plant 1 is described. For example, in the LNG plant 1, natural gas (NG) being fluid to be processed, from which an impurity has been removed by pre-processing, is precooled in precooling heat exchangers 31. After being subjected to gas-liquid separation in a scrub column 32, the NG is liquefied and subcooled in a main cryogenic heat exchanger (MCHE) 33 to obtain LNG. Liquid obtained through the gas-liquid separation in the scrub column 32 is rectified in a rectifying unit 34. A light component separated at the time of rectification is sent to the MCHE 33 to turn into LNG.

As a liquefying refrigerant for liquefying and subcooling the NG, for example, a mixed refrigerant (MR), which is a mixture of a plurality of kinds of refrigerant raw materials such as nitrogen, methane, ethane, and propane, is used.

The MR, which has been used for the liquefaction and the subcooling of the NG, flows out of the MCHE 33 under a gaseous state, and is sequentially compressed in a plurality of MR compressors 36, each to be driven by, for example, a gas turbine (G/T). The compressed MR is cooled in MR coolers 204 (each including an air cooled heat exchanger (ACHE) 2), each being provided on an outlet side of a corresponding one of the MR compressors 36. The MR after the compression and the cooling is further cooled in MR coolers 37, and is then resupplied to the MCHE 33.

In the LNG plant 1 of this example, a C3 refrigerant made of a single component such as propane or propylene is used as a refrigerant for precooling the NG in the precooling heat exchangers 31 or a refrigerant for cooling the MR in the MR coolers 37. The C3 refrigerant, which has been used for the precooling of the NG or the cooling of the MR, is also compressed and cooled, and is then resupplied to the precooling heat exchangers 31 or the MR coolers 37.

A pressure of a liquid C3 refrigerant is reduced via an expansion valve (not shown). The liquid C3 refrigerant is supplied to the precooling heat exchangers 31 and the MR coolers 37 under a state in which a temperature thereof is decreased through adiabatic expansion to cool each fluid to be cooled (NG and MR).

In a post-stage of a C3-refrigerant compressor 35, a desuperheater 201, a condenser 202, a receiver (receiving tank) 353, and a subcooler 203 are arranged in the stated order from an upstream side. The desuperheater 201 is configured to cool a gaseous C3 refrigerant in a gaseous state, which has a temperature increased in a process of compression. The condenser 202 is configured to further cool the gaseous C3 refrigerant cooled in the desuperheater 201 to condense the gaseous C3 refrigerant. The receiver 353 is configured to accumulate the liquid C3 refrigerant flowing out of the condenser 202. The subcooler 203 is configured to further cool the liquid C3 refrigerant to turn the liquid C3 refrigerant into a subcooled state. The liquid C3 refrigerant, which has been subcooled in the subcooler 203, is sent to the precooling heat exchangers 31 and the MR coolers 37 again via the above-mentioned expansion valve. Each of the desuperheater 201, the condenser 202, and the subcooler 203 is formed of ACHEs 2.

In the LNG plant 1 of the configuration example described above, the number of installed ACHEs 2 (the desuperheater 201, the condenser 202, and the subcooler 203) relating to the precooling a C3 refrigerant is large, and is sometimes about one hundred in a case of a large-scale LNG plant 1. The ACHEs 2 including those for the MR coolers 204 are arranged in rows on top of each of the pipe racks 12 (FIG. 1). In the following description, a unit of installation of the ACHE 2 is referred to as "bay". The number of bays corresponds to "installation number" of this example. Further, a plurality of bays (heat exchanger group: ACHE group) installed for each purpose, for example, for the desuperheater 201 or the condenser 202 are also referred to as "items".

As illustrated in FIG. 1, the pipe racks 12, on each of which a plurality of ACHEs 2 are installed, occupy the largest area in the LNG plant 1. Thus, determination of an installation area for the pipe racks 12 is an important element for determination of a plot plan of the overall LNG plant 1.

Before description of specific contents of the method of designing an ACHE group of this example, an example of a basic structure of the ACHE 2 is described.

Figure 3:
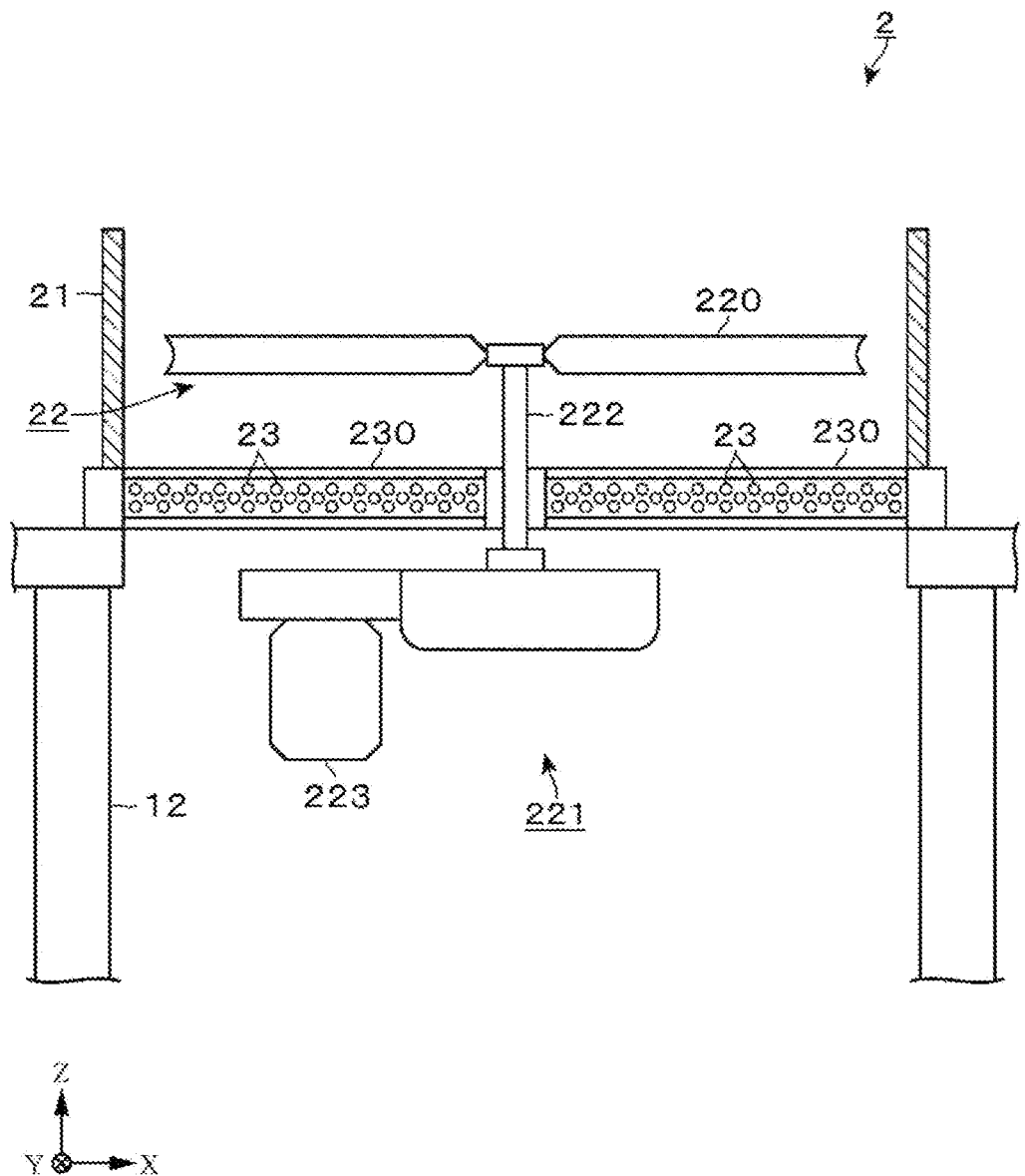
FIG. 3 is a longitudinal sectional side view for illustrating a configuration example of an ACHE installed in the LNG plant.

As illustrated in FIG. 3, the ACHE 2 includes a tube bundle 230 and a fan 22. The tube bundle 230 is a bundle of a plurality of tubes (heat transfer tubes) 23 through which fluid to be cooled (fluid to be processed, which is treated in the LNG plant 1, such as a liquefying refrigerant, a precooling refrigerant, and other fluid to be treated in a process performed in a pre-processing unit) flows. The fan 22 is configured to supply cooling air to the tube bundle 230.

The tube bundle 230 is open on both of an upper side and a lower side, and allows the cooling air to pass from a lower side toward an upper side through gaps between the tubes 23 adjacent to each other. Further, a frame body for forming side peripheral portions of the tube bundle 230 is fixed onto an upper surface of a framework for forming the pipe rack 12.

The fan 22 includes a plurality of moving blades 220 provided so as to extend radially from a center of rotation. A proximal end portion of each of the moving blades 220 is connected to an upper end of a rotary shaft 222 at the center of rotation. The rotary shaft 222 is arranged so as to extend in a vertical direction. A lower side of the rotary shaft 222 penetrates the tube bundle 230. A lower end portion of the rotary shaft 222 is connected to a rotational driving unit 221 arranged below the tube bundle 230.

For example, the rotational driving unit 221 may include a pully mechanism (not shown) and a rotation motor 223, which are provided to the lower end portion of the rotary shaft 222, so that the rotary shaft 222 is rotated by the rotation motor 223. Further, the rotary shaft 222 may be directly coupled to the rotation motor.

A duct 21 is provided in a region from an upper surface of the frame body of the tube bundle 230 to a position above the fan 22 through a position on each side of the fan 22. The duct 21 forms an exhaust passage for allowing air having passed through the tube bundle 230 to flow therethrough. Each of the ducts 21 is open toward an upper surface side at a position above the fan 22.

As illustrated in FIG. 1 and FIG. 3 described later, in this example, for example, three sets, each including the fan 22, the rotational driving unit 221, and the ducts 21, which are described above, are arranged along a short-side direction of the pipe rack 12 to form one ACHE 2 (bay).

When the fans 22 are rotated in the ACHE 2 having the above-mentioned configuration, flow of the cooling air passing through the tube bundle 230 from the lower side to the upper side is generated. Then, through heat exchange with the cooling air supplied to a surface of each of the tubes 23, the fluid to be cooled flowing through the tubes 23 is cooled.

Based on the above-mentioned configuration example of the ACHE 2, for example, the number of bays, a design variable relating to the tube bundle 230, a design variable relating to the tube 23, and a design variable relating to the fan 22 can be exemplified as design variables relating to designing of the ACHE group including a plurality of ACHEs 2.

As specific examples of the design variable relating to the tube bundle 230, the following design variables may be exemplified. The examples of the design variable include the number of tube bundles 230, the number of tubes 23 included in each of the tube bundles 230, a passage number, which is the number of passages when each of the tubes 23 is provided so as to pass through the tube bundle 230 for a plurality of times, the number of stages of the tubes 23 (three in the example illustrated in FIG. 3) when the tubes 23 are arranged in the vertical direction inside the tube bundle 230, a type of arrangement intervals (equal intervals/unequal intervals) between the heat transfer tubes when the tubes 23 are arranged in a plurality of stages, and a length of each of the tubes 23 from one end to another end of the tube bundle 230.

As specific examples of the design variable relating to the tube 23, for example, an outer diameter and a wall thickness of each of the tubes 23, and an arrangement pitch of the tubes 23 may be exemplified. As specific examples of the design variable relating to the fan 22, for example, the number of fans 22 to be installed in each bay, a diameter of the fan 22, a fan efficiency, and a face velocity of the cooling air supplied by the fan 22 may be exemplified.

The design variables exemplified above correspond to a design variable group of this example. A design variable is selected from the design variable group described above as a variable parameter, and a variable range and a change unit thereof can be set.

Further, in addition to the above-mentioned design variables, the following design values may be exemplified as a design value required for the designing of the ACHE group: a draft type of the ACHE 2 (forced draft type in which the moving blades 220 of the fan 22 are arranged below the tube bundle 230 or induced draft type in which the moving blades 220 of the fan 22 are arranged above the tube bundle 230; the example of FIG. 3 corresponds to the induced draft type); properties of the fluid to be cooled; a flow rate; a heat exchange amount; a temperature condition at an inlet or an outlet; a suction temperature of the cooling air; material specifications (such as an employed material and a grade) of the tube 23; material specifications of a fin when the fin is formed on the tube 23; fouling factors of an inside and an outside of the tube 23; an allowable pressure loss of the tube bundle 230; an elevation at a location at which the ACHE group is installed, a height and a thickness of the fin and the number of fins installed per inch when the fins are provided; whether or not the duct 21 or a fan ring is provided around the fan 22; a shape of the fan ring when the fan ring is provided; and a height of the duct 21 when the duct 21 is provided.

As the design values described above, fixed values or types are selected after being examined in advance.

Distinction between the detailed items exemplified as the above-mentioned design variables and the detailed items exemplified as the design values is not fixed. Fixed values or types may be set as the design values for the detailed items, which are described above as the design variable, and variable parameters, each having a changeable value or correspondence, may be set as the design variables for the detailed items, which are described above as the design values.

For the ACHE group, a design is determined so that, after each of the above-mentioned design values is set, suitable values are selected for the variable parameters while each of the variable parameters is being changed.

Figure 4:
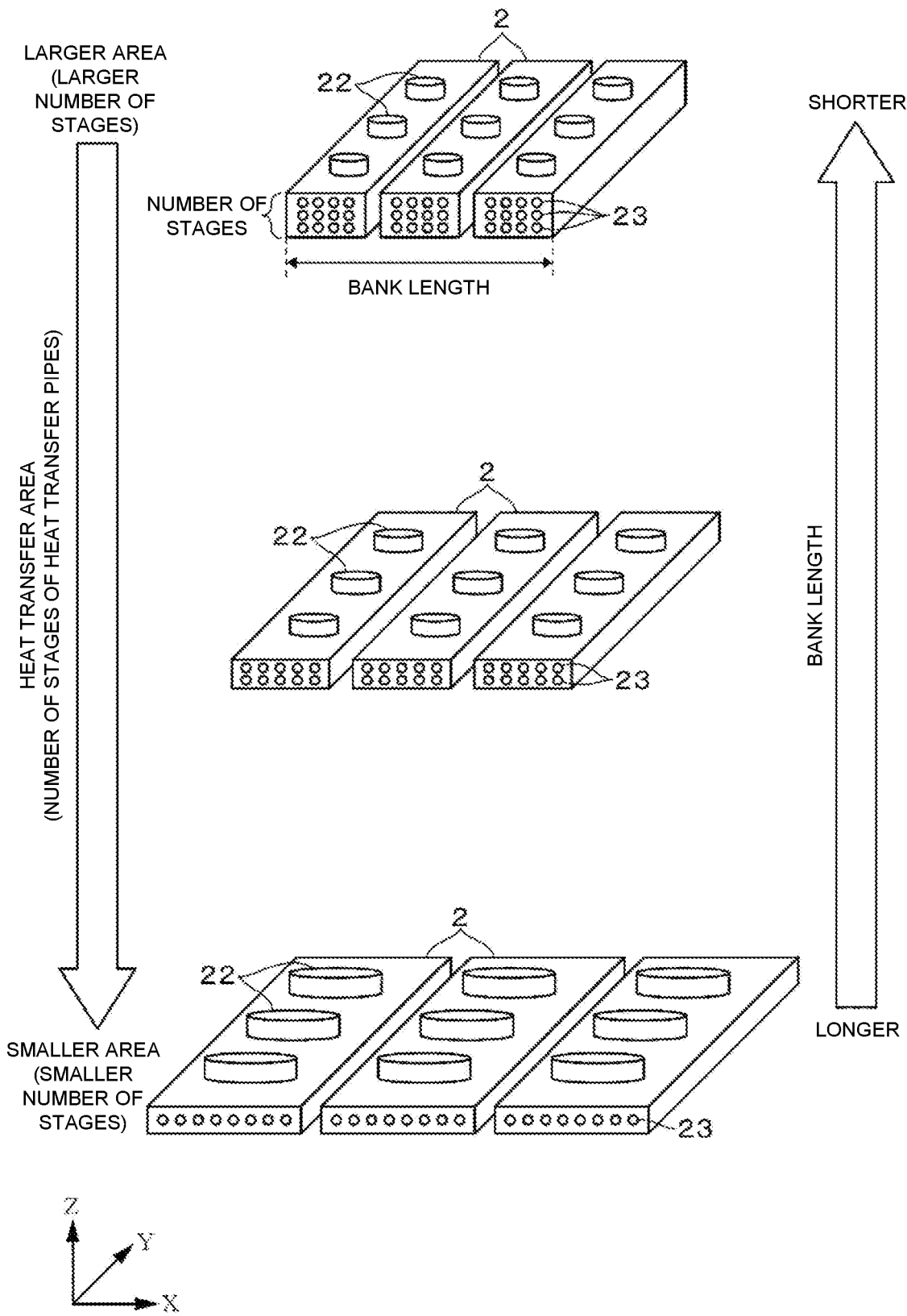
FIG. 4 is an explanatory view for illustrating an influence of changes in design variables on an ACHE group.

FIG. 4 is an explanatory view for illustrating an idea of the design of the ACHE group in each item. The following is understood from FIG. 4. For example, even when the number of bays to be installed in one item (three bays in an example illustrated in FIG. 4) is the same, the installation area for the bays, specifically, a length of the ACHEs 2 in a direction of arrangement in the item when lengths of the ACHEs 2 in a Y direction are the same in FIG. 4, more specifically, a bank length greatly changes in accordance with the values of the variable parameters.

In particular, the number of stages of the tubes 23 in the vertical direction in the tube bundle 230 is one of the variable parameters that affect the bank length of the ACHE group. In a case in which other variable parameters are not taken into consideration, when the number of stages of the tubes 23 is increased, the bank length can be shortened, specifically, the installation area for the ACHE group can be reduced. As the number of stages is reduced, the bank length tends to increase, specifically, the installation area for the ACHE group tends to increase.

Meanwhile, a supply temperature of the cooling air increases for the tubes 23 arranged in a higher stage. Thus, cooling efficiency is lowered for the tubes 23 arranged in the higher stage. As a result, as the number of stages increases, a total heat transfer area of the tubes 23, which is required as the whole ACHE group, tends to increase. The increase in total heat transfer area directly leads to increase in amount of use of a material for the tubes 23 in the ACHE group, which becomes one of factors of increase in cost of the ACHE group.

Further, as the number of stages of the tubes 23 increases, a pressure loss of the tube bundle 230 increases. Thus, power consumption of the rotational driving unit 221 for the fan 22 also tends to increase.

Thus, for the designing of the ACHE group, unless a relationship between decrease/increase in installation area and increase/decrease in total heat transfer area of the tubes 23 or in total power consumption of the fans 22 is grasped, suitable variable parameters cannot be specified.

Further, when a plurality of items such as the desuperheater 201, the condenser 202, and the subcooler 203 are arranged on the common pipe rack 12, options for specifying suitable variable parameters further increase (for example, FIG. 5(A) to FIG. 5(C)).

In this case, when a selectable material for the tubes 23 differs depending on the items, material unit cost of the tubes 23 is high for one item, and thus the reduction in total heat transfer area is regarded as more important than the reduction in installation area in some cases. Meanwhile, the material unit cost is relatively low for another item, and thus it is preferred that the reduction in installation area be regarded as more important than the reduction in total heat transfer area in some cases.

The above-mentioned change of selection criteria for the design variables in accordance with the items leads to complication of combinations of the values of the variable parameters in designing of all the ACHE groups to be arranged on the pipe racks 12. Hence, a trial-and-error process is required to be repeated in many cases.

Accordingly, with the method of designing an ACHE group of this example, for the designing of the ACHE group for each of the items, which has been described with reference to FIG. 4, the number of ACHEs 2 to be installed (the number of bays), which greatly affects the installation area for the ACHE group, is set as an essential variable parameter so that the number of bays can be varied.

In addition, another design variable in the design variable group described above is set as a variable parameter, and a variable range and a change unit of the variable parameter are set. Then, at least two objective functions are selected from the bank length (installation length) of the ACHE group when the plurality of ACHEs 2 are arranged in one row, the total heat transfer area of the tubes 23 included in the ACHE group, and total power consumption of the fans 22 included in the ACHE group. Then, a search for Pareto solutions (trade-off curve) is conducted with use of a computer while the variable parameters described above are being changed. The bank length, the total heat transfer area of the tubes 23, and the total power consumption of the fans 22, which have been described above, correspond to an objective function group of this example.

A combination of the objective functions for which the search is to be conducted may be a combination of the bank length of the ACHE group and the total heat transfer area of the tubes 23 or a combination of the bank length and the total power consumption of the fans 22. Further, first Pareto solutions (trade-off front) for all the three objective functions may be calculated.

The term "Pareto solution" in this example is used as the term having the same meaning as general meaning in a multi-objective optimization problem. Specifically, when one of objective functions is desired to be improved in a case in which the objective functions are to be maximized or minimized, a "Pareto solution" is a combination of feasible solutions located at a limit at which another one of the objective functions deteriorates. In this example, a search is conducted under a condition that the bank length, the total heat transfer area of the tubes 23, and the total power consumption of the fans 22 are minimized.

The above-mentioned search for the Pareto solutions can be executed with use of a computer using commercially available versatile optimization software. As examples of the above-mentioned software, mode FRONTIER developed by ESTECO S.p.A., Hyper Study developed by Altair Engineering, Optimus developed by Noesis Solutions, and HEED developed by Red Cedar Technology, Inc. are exemplified.

In this case, the execution of the search for Pareto solutions with use of the versatile optimization software is not an essential requirement. The search for Pareto solutions may be executed with use of a search tool developed specifically for the search for Pareto solutions.

The search for the Pareto solutions can be conducted by a multi-objective genetic algorithm or a multi-objective particle swarm optimization method with use of the optimization software or the search tool, which are described above. As specific examples of the algorithm for executing the multi-objective optimization method, a neighborhood cultivation genetic algorithm (NCGA), normal boundary intersection (NBI), and indirect optimization on the basis of self-organization (IOSO) are exemplified. However, the search for Pareto solutions is not limited to a case in which any one of the methods exemplified above is used. An appropriate method, with which the search for Pareto solutions for the objective functions described above can be conducted, may be used.

Figure 6:
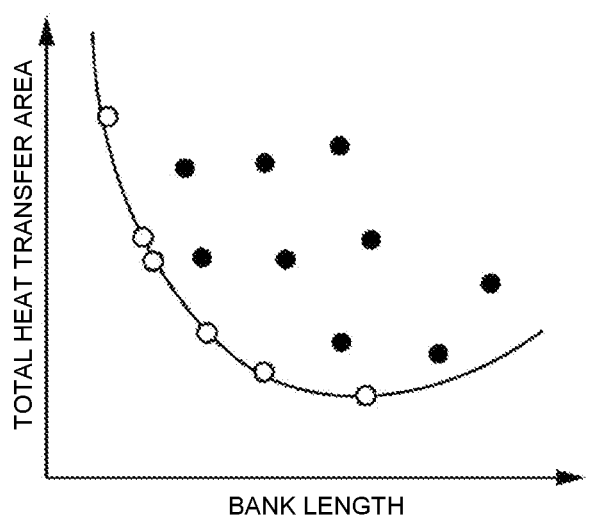
FIG. 6 are graphs, each for showing an outline of first Pareto solutions for the ACHE group of each of the items.
Figure 6:
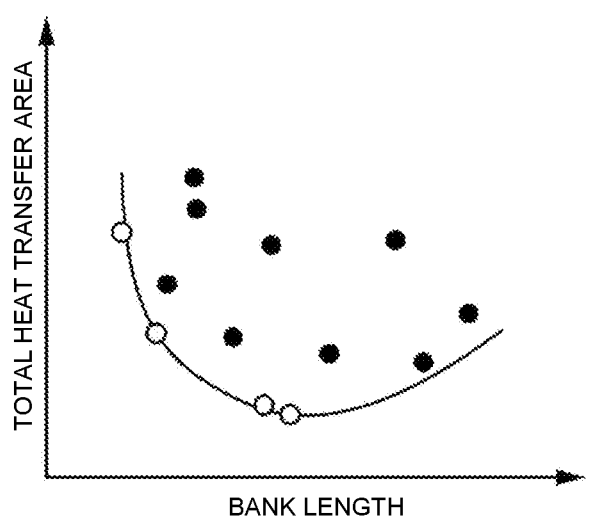
Figure 6:
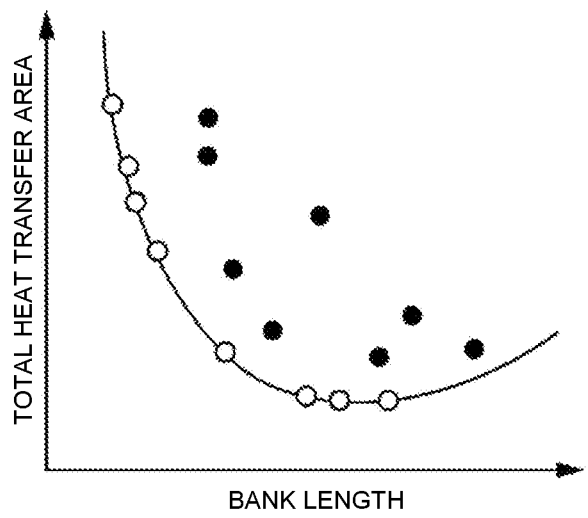

As a result of the execution of the above-mentioned method for the ACHE groups relating to the items, specifically, the desuperheater 201, the condenser 202, and the subcooler 203, for example, Pareto solutions indicated by solid lines in FIG. 6(a) to FIG. 6(c) can be obtained. In FIG.

6(a) to FIG. 6(c), Pareto solutions (first Pareto solutions) obtained for objective functions of the bank length of the ACHE group and the total heat transfer area of the tubes 23 are schematically shown.

Figure 7:
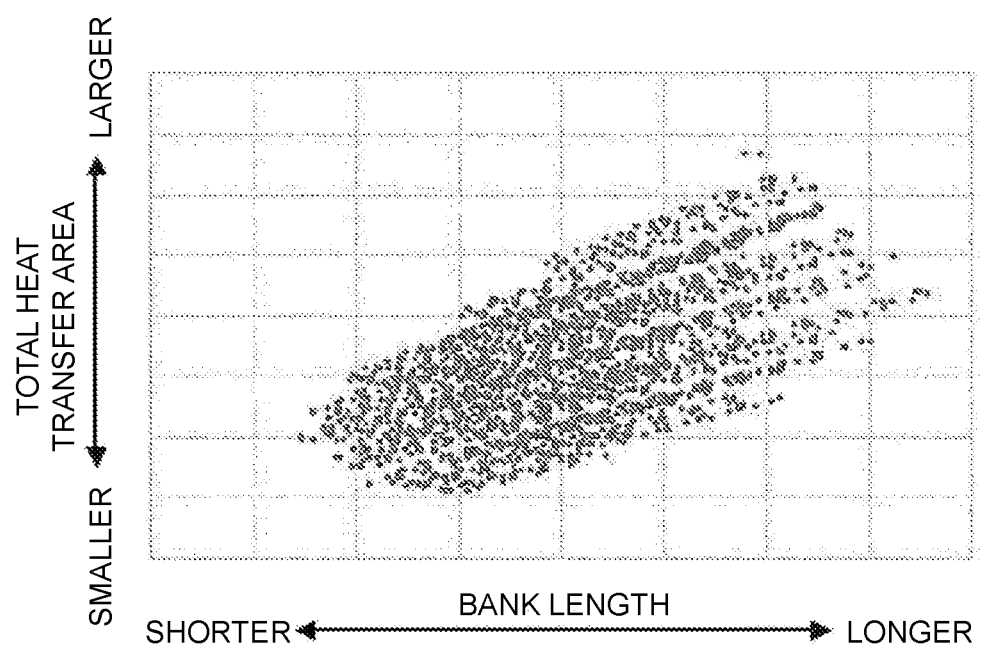
FIG. 7 is a graph for showing a result of a search for combinations of feasible solutions with use of a computer.

In FIG. 7, there is shown a result of calculation for a set of solutions of the bank length and the total heat transfer area by a brute-force search, which is performed while predetermined variable parameters are being changed. Based on FIG. 7, it is verified that the Pareto solutions, each being a set of solutions that are not dominated by other solutions, can be calculated. It is verified that, with employment of the above-mentioned multi-objective optimization method for the search for the solutions, the first Pareto solutions schematically shown in FIG. 6(a) to FIG. 6(c) can be calculated.

Figure 5:
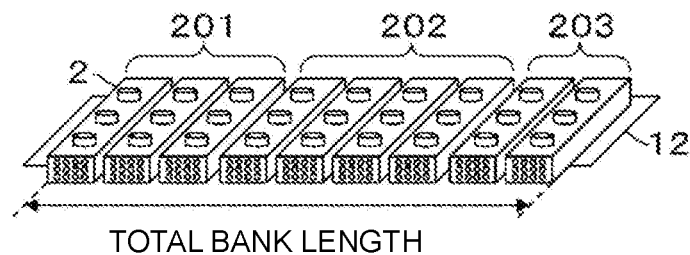
FIG. 5 are explanatory views for illustrating an influence of changes in design variables on the ACHE groups in a plurality of items.
Figure 5:
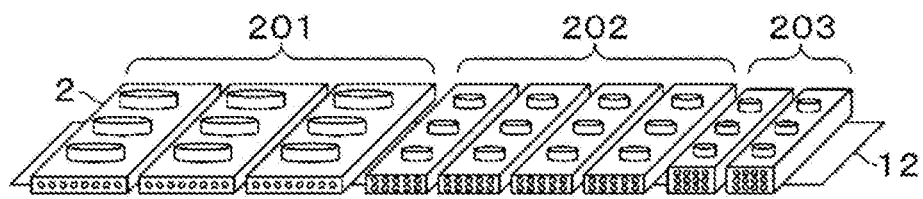
Figure 5:
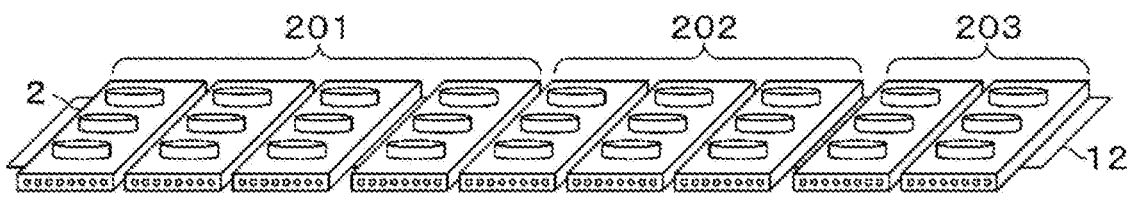

Further, for a combination of ACHE groups for the plurality of items, which has been described with reference to FIG. 5, the results of calculations of the first Pareto solutions for the ACHE groups for the items described above are used. For example, a total bank length (total installation length) and a device cost (total heat transfer area of the items×unit price of components of the tubes 23 per unit area) of three items are selected as objective functions, and second Pareto solutions (trade-off curve) for the objective functions described above are calculated.

In this example, a combination for minimizing the total bank length and the device cost for the ACHE groups for the plurality of items is calculated.

Figure 8:
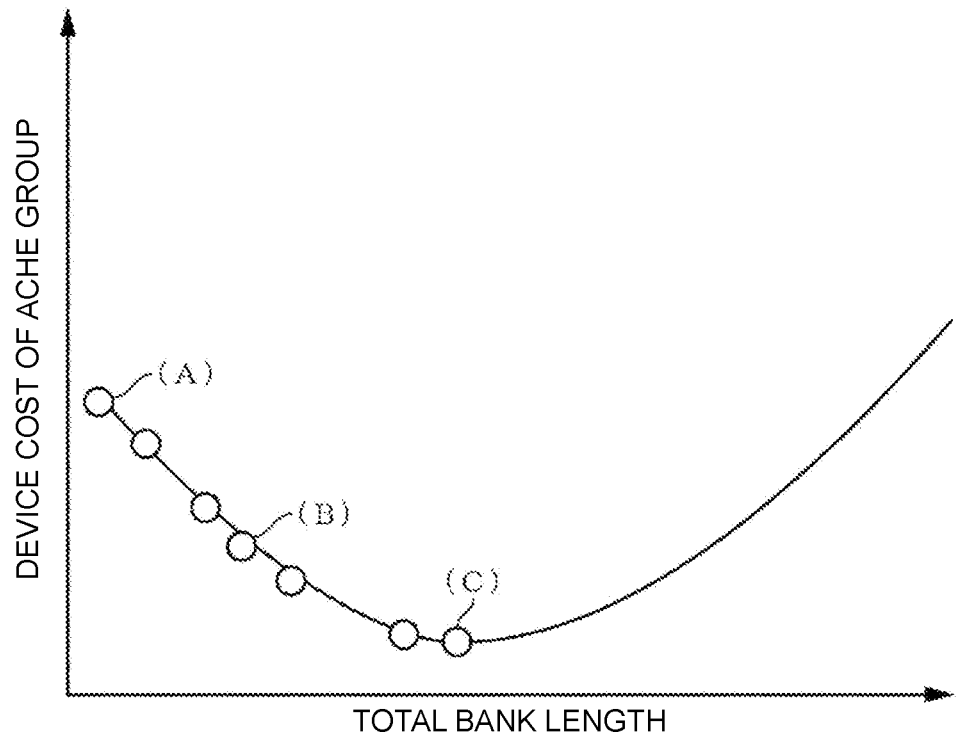
FIG. 8 is a graph for showing an outline of second Pareto solutions obtained when the ACHE groups of the plurality of items are combined.

As a specific technique for calculating the second Pareto solutions, the so-called Knapsack problem, which is an integer programming problem, is solved. The integer programming problem is solved to find, when an upper limit of the total bank length is set, a combination of the first Pareto solutions for the items shown in FIG. 6, which minimizes the device cost of the ACHE groups so that the total bank length does not exceed the upper limit. The problem is solved while the upper limit of the total bank length is being changed so as to be gradually increased (or gradually decreased). As a result, a second Pareto curve shown in FIG. 8 can be obtained. For example, when the combinations of the items illustrated in FIG. 5(A) to FIG. 5(C) are included in the second Pareto solutions, the combinations of FIG. 5(A) to FIG. 5(C) form a part of the second Pareto curve of FIG. 8.

The integer programming problem described above can be solved by publicly-known dynamic programming.

When the total bank length is already determined or the minimization of the device cost of the ACHE groups is determined as being selected as the objective function, the calculation of the second Pareto solutions is not essential. Only one optimal solution may be calculated under the conditions described above.

Further, as illustrated in FIG. 1, when the plurality of pipe racks 12 are to be arranged in the LNG plant 1, the search for the above-mentioned first Pareto solutions and second Pareto solutions may be conducted for each of the pipe racks 12. Alternatively, the first Pareto solutions and the second Pareto solutions may be calculated for all the pipe racks 12. Then, when an actual plot plan is determined, the ACHE groups obtained by the above-mentioned Pareto solutions may be divided into a plurality of blocks so that the blocks are arranged on the pipe racks 12.

Figure 9:
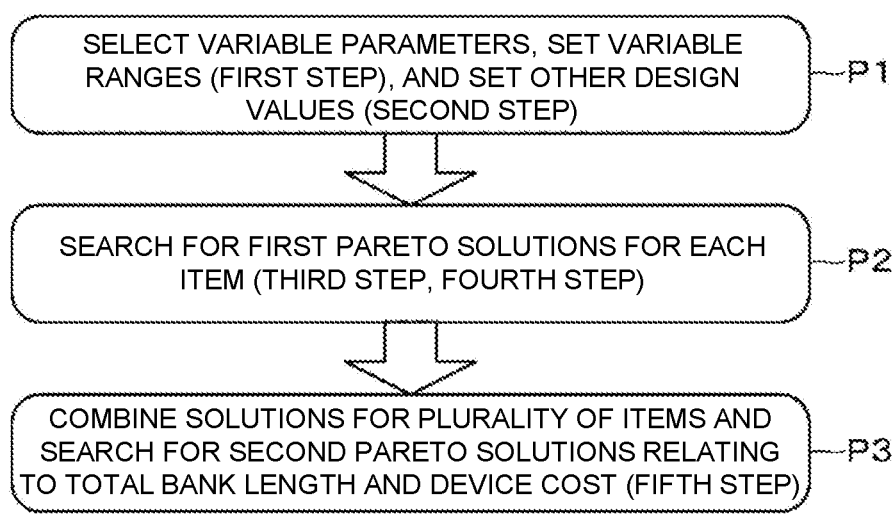
FIG. 9 is an explanatory view for illustrating a procedure of executing a method of designing an ACHE group according to an embodiment.
Figure 10:
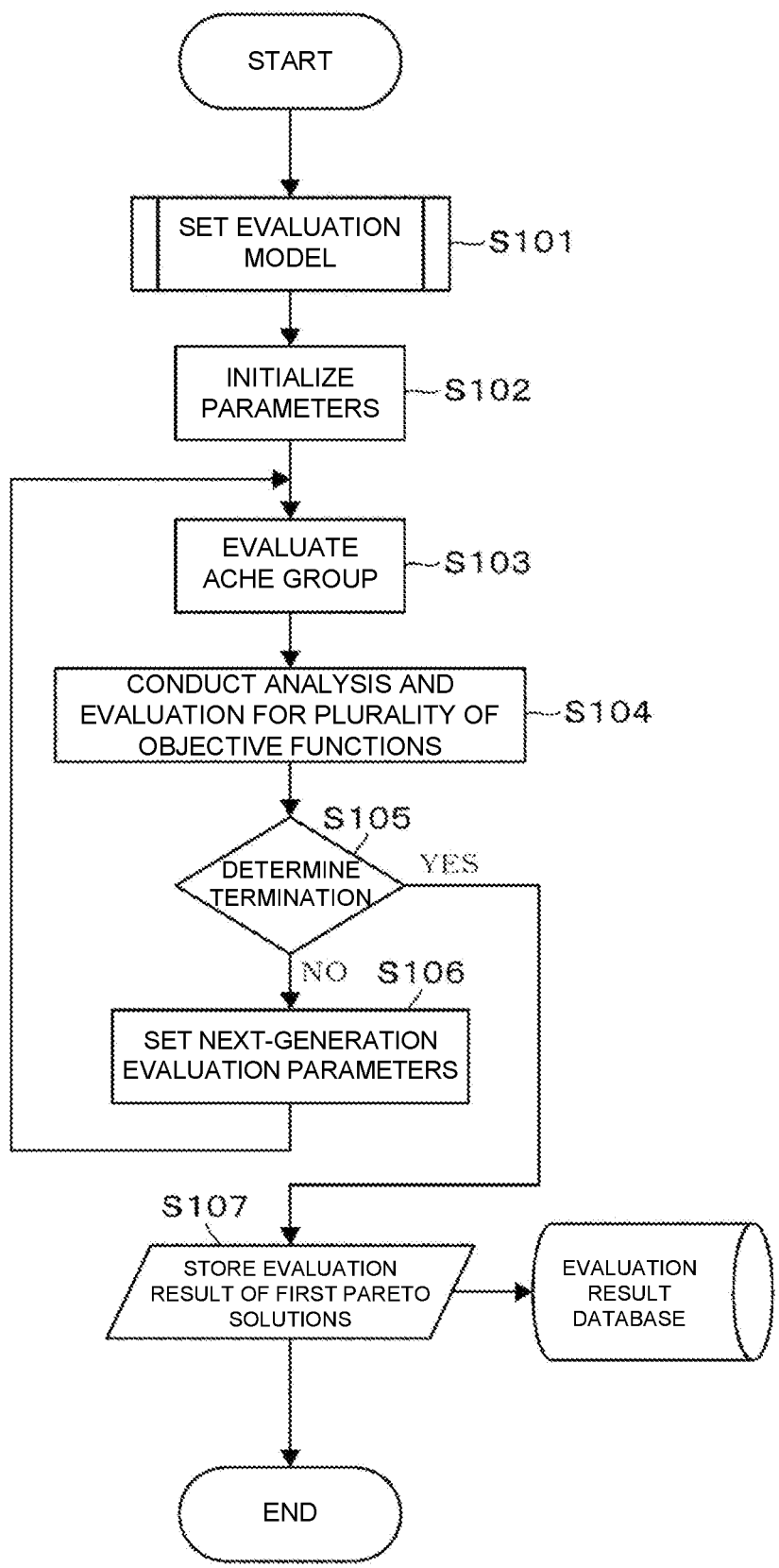
FIG. 10 is a flowchart relating to a first step, a second step, and a third step of the designing method.
Figure 11:
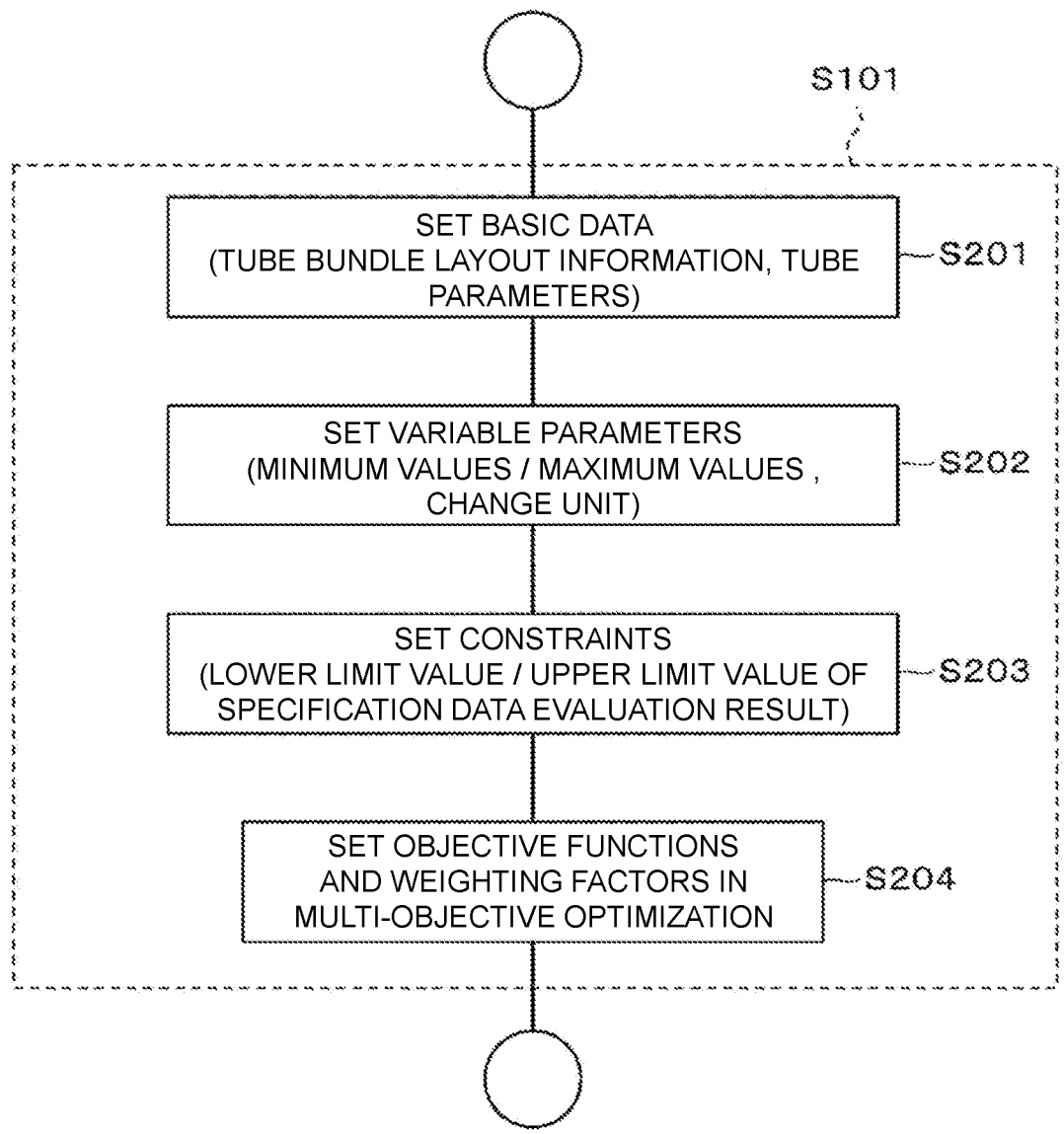
FIG. 11 is a flowchart of Step S101 (setting of an evaluation model) of FIG. 10.
Figure 12:
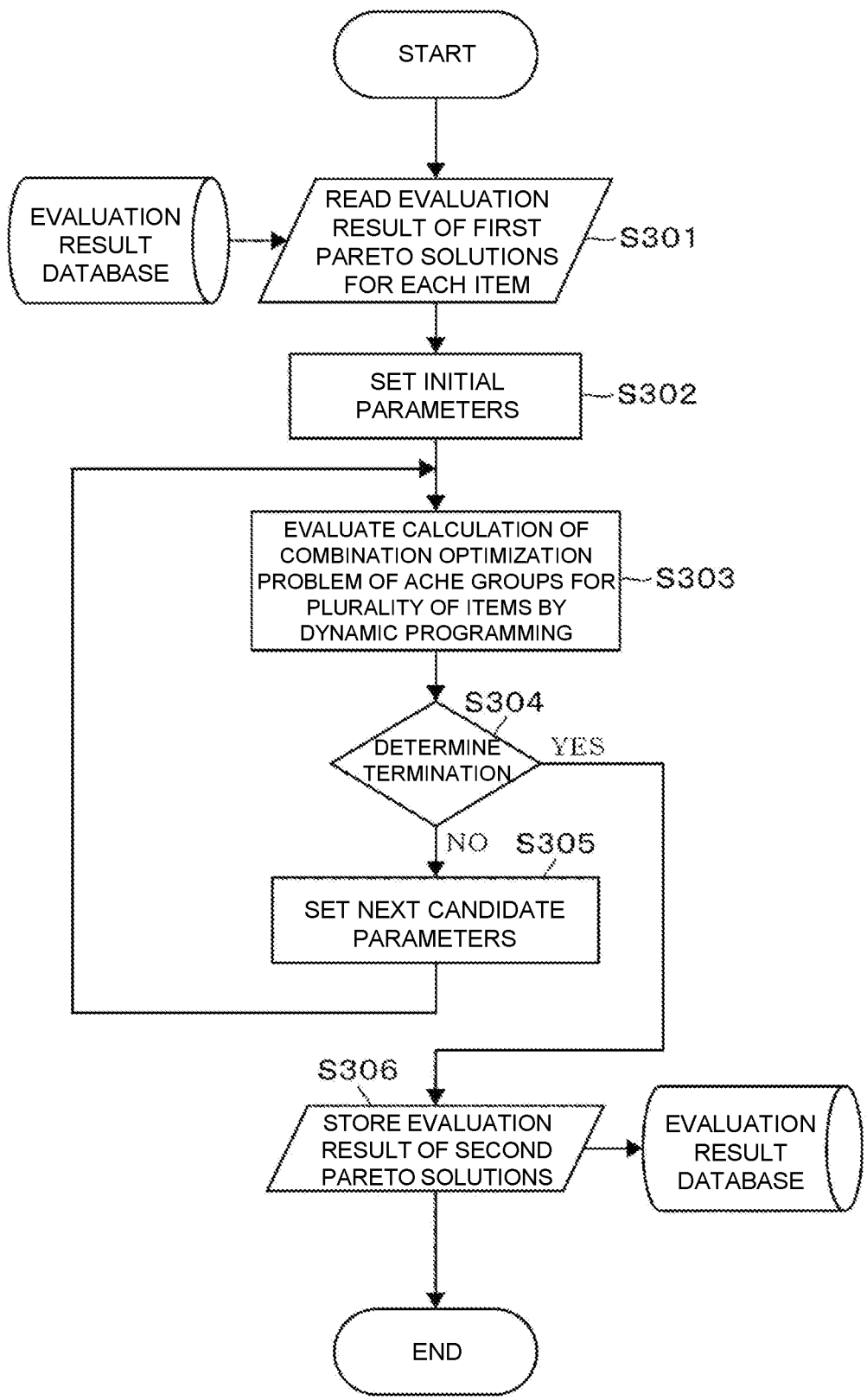
FIG. 12 is a flowchart relating to a fourth step and a fifth step of the designing method.

Now, with reference to FIG. 9 to FIG. 12, a specific procedure of obtaining the Pareto solutions described above is described. FIG. 9 is an illustration of an outline of the procedure, and FIG. 10 to FIG. 12 are illustrations of more detailed operation flows.

First, the variable parameters are selected and the variable ranges thereof are set (first step), and other design values are set (input of fixed values and selection of types; second step) (Process P1 of FIG. 9). Actual order of execution of the first step and the second step is not limited, and any one of the first step and the second step may be first executed.

More specifically, the above-mentioned optimization software or dedicated search tool is operated on a computer to set a detailed model (Step S101 of FIG. 10). For example, as illustrated in FIG. 11, other design values (such as layout information of the tube bundle 230 and various design values of the tube 23) are first input (Step S201). Subsequently, the variable parameters (setting of a maximum value and a minimum value, which define a variable range, and a change unit of each of the variable parameters) are set (Step S202). Further, constraints (a lower limit value and an upper limit value of each specification data evaluation result) are set (Step S203). Examples of the specification data include a pressure loss of the tube bundle, a noise value, and a power consumption amount. Then, the objective functions are set, and weighting factors for the variable parameters are set (Step S204).

Subsequently, for the items, the search for the first Pareto solutions (third step, fourth step) is sequentially executed (Processing P2 of FIG. 9).

More specifically, the variable parameters to be first examined are selected within the above-mentioned range defined by the minimum value and the maximum value, specifically, the variable parameters are initialized (Step S102). Then, the ACHE group is evaluated under conditions with the results of selection of the variable parameters and the other design values, which have already been set (Step S103). In the above-mentioned evaluation, values of the variable parameters and the other design values are output to a heat exchanger simulator. The heat exchanger simulator performs, for example, a heat transfer calculation for calculating the total heat transfer area of the tubes 23.

Further, the bank length is calculated by multiplying the number of ACHEs 2 to be installed (the number of bays) in the ACHE group by a width of the ACHE 2 when seen along an X direction of FIG. 4.

Then, a plurality of objective functions (the bank length and the total heat transfer area in this case) are obtained from the bank length and the total heat transfer area acquired from the heat exchanger simulator, and analysis and evaluation of the objective functions are performed (Step S104).

When a result of the evaluation does not meet a termination condition (for example, a condition in which any other non-dominated solutions are not found within the ranges defined by the constraints described above in a predetermined repeated calculation period) (Step S105; NO), next-generation evaluation parameters are set (step S106). Then, Steps S103 and Step S104 are repeatedly executed.

As a result of the execution of Step S104, when the evaluation result meets the termination condition (Step S105; YES), the values of the variable parameters, which correspond to the combination of the values of the objective functions for each of the obtained Pareto solutions, and the evaluation result, are stored in a database (Step S107). Then, the series of operations is terminated.

Subsequently, with use of a combination of the solutions for the plurality of items, a search for the second Pareto solutions relating to the total bank length and the device cost is conducted (Process P3 of FIG. 9).

More specifically, as illustrated in FIG. 12, the variable parameters and the combinations of the values of the objective functions, which relate to the first Pareto solutions obtained in Process P2, are read from the database (Step S301).

After that, initial parameters for selecting the bank length and the total heat transfer area for each of the items from the first Pareto solutions described above are set (Step S302). Then, an optimization calculation for calculating the total bank length and the cost of the ACHE groups and an evaluation are performed for the ACHE groups of the plurality of items by the dynamic programing (Step S303).

For example, the total bank length is calculated from a sum of the bank lengths of the selected items, and the device cost is calculated based on a result obtained by multiplying the total transfer area of the selected items by the cost of the tubes 23 per unit heat transfer area.

When the obtained evaluation result does not meet a termination condition (for example, a condition that the optimization calculation has been completed for a predetermined change range, which is set for the total bank length) (Step S304; NO), next candidate parameters are set (Step S305). Then, Step S303 is repeatedly executed.

As a result of the execution of Step S303, when the evaluation result meets the termination condition (Step S304; YES), a combination of the values of the objective functions for each of the obtained Pareto solutions and a combination of the second Pareto solutions for each of the items, which correspond to the combination of the values of the objective functions, and the evaluation result are stored in the database (Step S306). Then, the series of operations is terminated.

When the combination of the first Pareto solutions, the combination of the second Pareto solutions, and the evaluation results are obtained through the steps described above, the bank length of the ACHE group, which is used in the LNG plant 1 to be actually constructed, and the total heat transfer area of the tubes 23 (first Pareto solutions), and the total bank length and the device cost (second Pareto solutions) are determined based on the information described above.

After, for example, the bank length of each of the ACHE groups and the total bank length, which relate to the plot plan of the whole LNG plant 1, are determined, each of the devices to be arranged in the device arrangement areas 11 is designed.

Further, each individual of the ACHEs 2 included in the ACHE group is designed in a detailed manner based on the variable parameters used for the search for the determined first Pareto solutions.

For the detailed design of the ACHE 2, changing the values of the variable parameters or the design values, which correspond to the selected first Pareto solutions, is not prohibited in terms of, for example, avoidance of interference between the devices and improvement of operability. For example, an allowable increase/decrease range may be set for each of the selected Pareto solutions (the bank length of the ACHE group, the total heat transfer area of the tubes 23, the total bank length, and the device cost) so that each of the variable parameters may be adjusted to fall within the increase/decrease range.

The designing of the LNG plant 1 is promoted by the method exemplified above. The LNG plant 1 including the ACHE groups, which are designed by the method of designing a heat exchanger group of this example, is constructed (manufactured) based on the result of designs.

According to the present invention, the Pareto solutions are calculated with use of the computer for the plurality of objective functions selected from the bank length of the ACHE group, the total heat transfer area of the tubes 23, and the total power consumption of the fans 22. Thus, optimal design values, which meet demands for the LNG plant 1, can be obtained.

In this case, in the example described with reference to FIG. 4 to FIG. 12, there has been described the method of searching for the first Pareto solutions for the bank length and the total heat transfer area of the ACHE group of each of the items as the objective functions and calculating the second Pareto solutions relating to the plurality of items with use of the results of search.

The method is not limited to the example described above. A search may be conducted for the first Pareto solutions for three objective functions of the bank length, the total heat transfer area of the tubes 23, and the total power consumption of the fans 22, and the second Pareto solutions may be calculated based on the result of search.

There has been described the result of application of the designing method of this example to the ACHE groups to be installed in the LNG plant 1 being the processing plant. However, the processing plant to which the designing method is applicable is not limited to the LNG plant 1.

For example, this technology can be applied to an ACHE group, which is installed in a gas processing plant or various types of petroleum refining plants. In the gas processing plant, liquid, which is heavier than ethane containing condensate, is recovered from the NG, which is fluid to be processed. Gas, which is lighter than methane, is shipped in a gaseous state without being liquefied to a demander or is consumed as fuel gas in a factory. In the petroleum refining plant, crude oil or each faction obtained from the crude oil is subjected to processing such as distillation, desulfurization, cracking, and reforming as fluid to be processed.

The invention claimed is:

1. A method of designing a heat exchanger group by a computer to obtain a designed heat exchanger group, wherein the designed heat exchanger group indicates an arrangement of the heat exchanger group to be installed in a processing plant, the processing plant is configured to process fluid to be processed and includes a plurality of air cooled heat exchangers (ACHEs), wherein the plurality of ACHEs are installed on a pipe rack according to the designed heat exchanger group, the method comprising:

a first step of selecting at least one design variable from a design variable group consisting of a design variable relating to a tube bundle to be provided to each of the ACHEs, a design variable relating to each of heat transfer tubes to be included in the tube bundle, and a design variable relating to a fan to be provided to each of the ACHEs as variable parameters, and selecting a number of installed ACHEs in the heat exchanger group as the variable parameters, and setting a variable range of each of the selected variable parameters;

a second step of setting design values of each of the ACHEs, which includes the design variables not selected as the variable parameters in the first step;

a third step of, after the setting of the design values, calculating Pareto solutions for at least two objective functions selected from an objective function group consisting of an installation length of the heat exchanger group when the plurality of ACHEs are arranged in one row, a total heat transfer area of the heat transfer tubes to be included in the heat exchanger group, and a total power consumption of the fans included in the heat exchanger group while changing the variable parameters within the variable range set in the first step; and constructing the processing plant having the plurality of ACHEs installed on the pipe rack according to the Pareto solutions calculated by the computer for the at least two objective functions selected from the installation length of the heat exchanger group, the total heat transfer area of the heat transfer tubes, and the total power consumption of the fans.

2. The method of designing a heat exchanger group according to claim 1, wherein
in the third step, the Pareto solutions are calculated by a multi-objective genetic algorithm or a multi-objective particle swami optimization method.

3. The method of designing a heat exchanger group according to claim 1, wherein, when a plurality of the heat exchanger groups are to be installed in the processing plant, the method further comprises:
a fourth step of executing the first step to the third step for each of the plurality of heat exchanger groups to calculate first Pareto solutions being the Pareto solutions for the objective functions of the installation length and the total heat transfer area; and
a fifth step of selecting a combination of the installation length and the total heat transfer area from the first Pareto solutions for the each of the plurality of heat exchanger groups and calculating at least one of a total installation length of the ACHEs of the plurality of heat exchanger groups when the ACHEs are arranged in one row and device cost of the plurality of heat exchanger groups based on a result of the selection of the combination.

4. The method of designing a heat exchanger group according to claim 3, wherein
the fifth step comprises: calculating second Pareto solutions for both of the total installation length and the device cost as the objective functions.

5. The method of designing a heat exchanger group according to claim 4, wherein
in the fifth step, the second Pareto solutions are calculated by dynamic programming.

6. The method of designing a heat exchanger group according to claim 1,
wherein the design variable relating to the tube bundle includes:
a design variable selected from the number of tube bundles to be provided to one ACHE, the number of heat transfer tubes to be included in the tube bundle, the number of passages of each of the heat transfer tubes to be included in the tube bundle, the number of stages of the heat transfer tubes in the tube bundle, a type of arrangement intervals between the heat transfer tubes in the tube bundle, and a tube length of each of the heat transfer tubes from one end to another end of the tube bundle;
wherein the design variable relating to each of the heat transfer tubes includes:
a design variable selected from an outer diameter of each of the heat transfer tubes, a wall thickness of each of the heat transfer tubes, and an arrangement pitch of the heat transfer tubes;
wherein the design variable relating to the fan includes:
a design variable selected from the number of installed fans in one ACHE, a diameter of the fan, a fan efficiency of the fan, and a face velocity of cooling air supplied to the ACHE by the fan.

7. A processing plant configured to process fluid to be processed, and the processing plant comprising:
a plurality of the ACHEs designed by the method of designing a heat exchanger group of claim 1.

* * * * *